US009834132B2

(12) United States Patent
Tanaka

(10) Patent No.: US 9,834,132 B2
(45) Date of Patent: Dec. 5, 2017

(54) VEHICLE EQUIPPED WITH MEANS FOR ILLUMINATING/WATCHING A SIDE AREA THEREOF

(71) Applicant: TOYOTA JIDOSHA KABUSHIKI KAISHA, Toyota-shi, Aichi-ken (JP)

(72) Inventor: Takeshi Tanaka, Kobe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/174,163

(22) Filed: Jun. 6, 2016

(65) Prior Publication Data

US 2016/0280126 A1 Sep. 29, 2016

Related U.S. Application Data

(63) Continuation of application No. 13/521,107, filed as application No. PCT/JP2011/072189 on Sep. 28, 2011, now abandoned.

(51) Int. Cl.
*B60Q 1/02* (2006.01)
*H04N 7/18* (2006.01)
(Continued)

(52) U.S. Cl.
CPC ............. *B60Q 1/0023* (2013.01); *B60Q 1/24* (2013.01); *B60Q 1/323* (2013.01); *B60R 1/002* (2013.01);
(Continued)

(58) Field of Classification Search
CPC ........ B60Q 1/0023; B60Q 1/323; B60Q 1/24; B60Q 2400/40; B60R 25/01; B60R 1/002; B60R 2300/70; H04N 7/18
See application file for complete search history.

(56) References Cited

U.S. PATENT DOCUMENTS 6,260,988 B1 7/2001 Misawa et al.
2002/0159270 A1* 10/2002 Lynam ................ B60Q 1/2607 362/487

(Continued)

FOREIGN PATENT DOCUMENTS

JP 2000-062531 A 2/2000
JP 2000-085408 A 3/2000

(Continued)

OTHER PUBLICATIONS

Dec. 9, 2015 Office Action issued in U.S. Appl. No. 13/521,107.

(Continued)

*Primary Examiner* — Sath V Perungavoor
*Assistant Examiner* — Howard D Brown, Jr.
(74) *Attorney, Agent, or Firm* — Oliff PLC

(57) ABSTRACT

In order to provide a vehicle in which a side road area of the vehicle to be watched by a side area watching camera is illuminated by a side area illumination lamp for illuminating a foot area of a man climbing into the vehicle when the vehicle is parked or driven carefully on an alley or a mountain road in the darkness, the vehicle is equipped with the side area illumination lamp for illuminating a side road area, a side area watching camera for watching the side road area, a navigation display and an electronic control unit, whereby the side area illumination lamp is put on when a man approaches the vehicle as well as when the vehicle is being driven at a vehicle speed less than a certain low threshold speed with the side area watching camera being made on.

11 Claims, 5 Drawing Sheets

10R
10L
12
14
22
16
24
20

(51) Int. Cl.

| | |
|---|---|
| ***B60Q 1/00*** | (2006.01) |
| ***B60Q 1/24*** | (2006.01) |
| ***B60Q 1/32*** | (2006.01) |
| ***B60R 1/00*** | (2006.01) |
| ***B60R 25/01*** | (2013.01) |

(52) U.S. Cl.
CPC ............... *B60R 25/01* (2013.01); *H04N 7/18* (2013.01); *B60Q 2400/40* (2013.01); *B60R 2300/70* (2013.01)

(56) References Cited

U.S. PATENT DOCUMENTS

| | | | | |
|---|---|---|---|---|
| 2010/0238292 | A1* | 9/2010 | Sato | B60R 1/00 348/148 |
| 2012/0002050 | A1* | 1/2012 | Taniguchi | H04N 7/181 348/148 |
| 2012/0229645 | A1* | 9/2012 | Yamada | B60Q 1/2665 348/148 |
| 2012/0320613 | A1* | 12/2012 | Singhal | B60Q 1/06 362/487 |
| 2014/0218521 | A1* | 8/2014 | Tanaka | B60Q 1/24 348/148 |

FOREIGN PATENT DOCUMENTS

| | | | |
|---|---|---|---|
| JP | 2002-211311 | A | 7/2002 |
| JP | 2004-189060 | A | 7/2004 |
| JP | 2005-051403 | A | 2/2005 |
| JP | 2008-306546 | A | 12/2008 |
| JP | 2009-057014 | A | 3/2009 |
| JP | 2010-228540 | A | 10/2010 |

OTHER PUBLICATIONS

Apr. 23, 2015 Office Action issued in U.S. Appl. No. 13/521,107.
Jan. 10, 2012 International Search Report issued in International Patent Application No. PCT/JP2011/072189.
U.S. Appl. No. 13/521,107, filed Jul. 9, 2012 in the name of Tanaka.

* cited by examiner

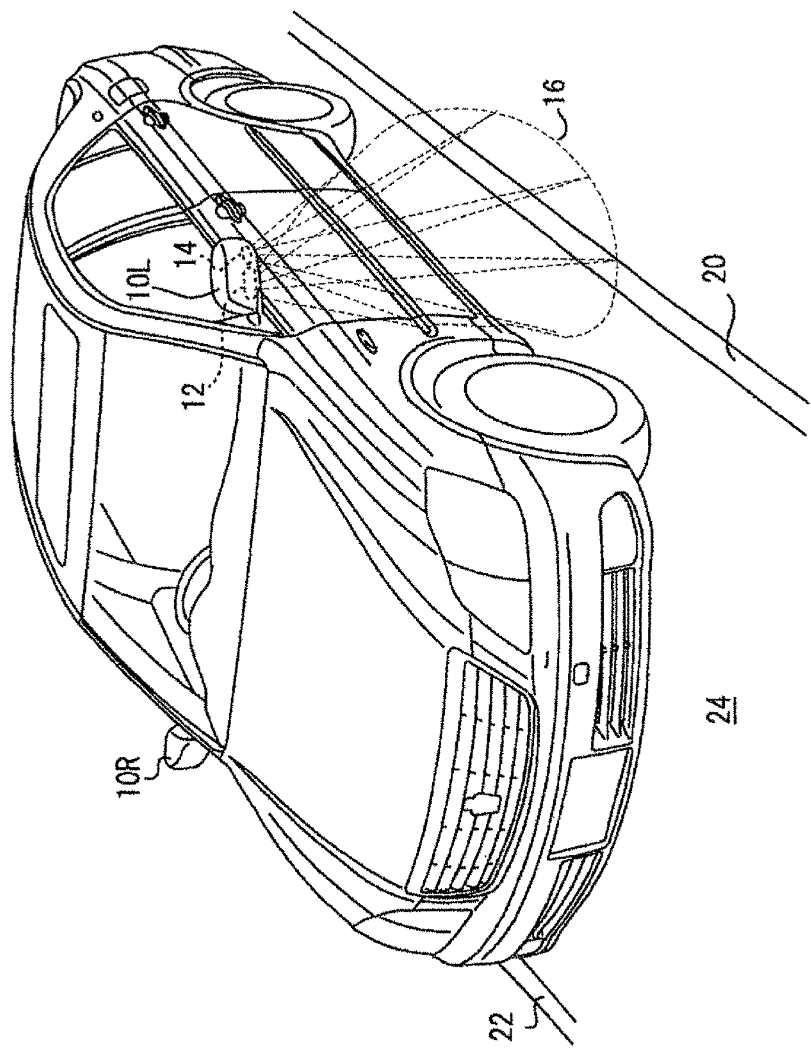
[FIG. 1]

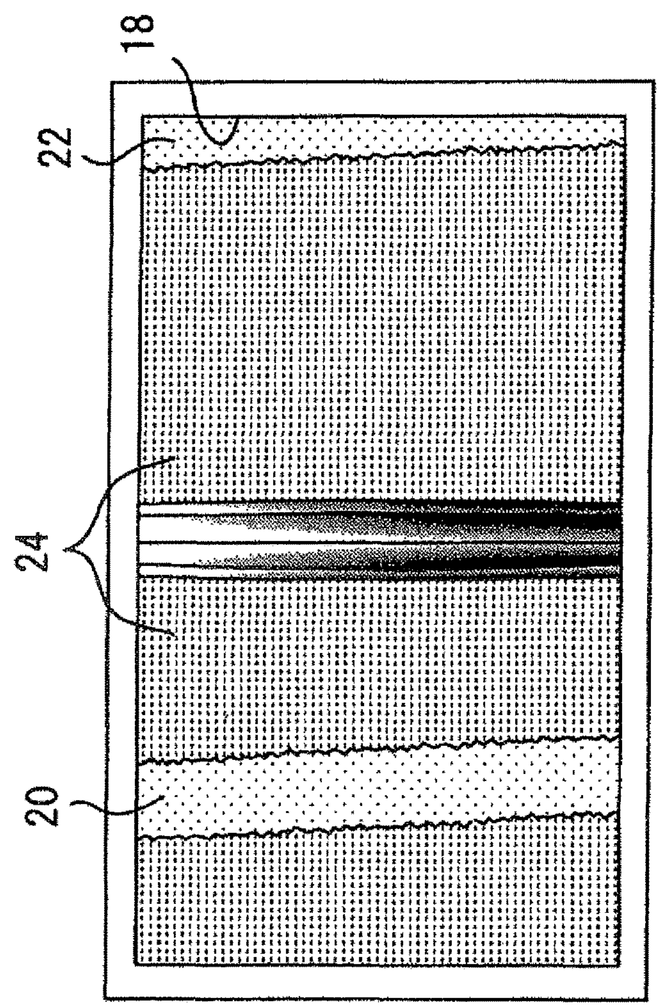
[FIG. 2]

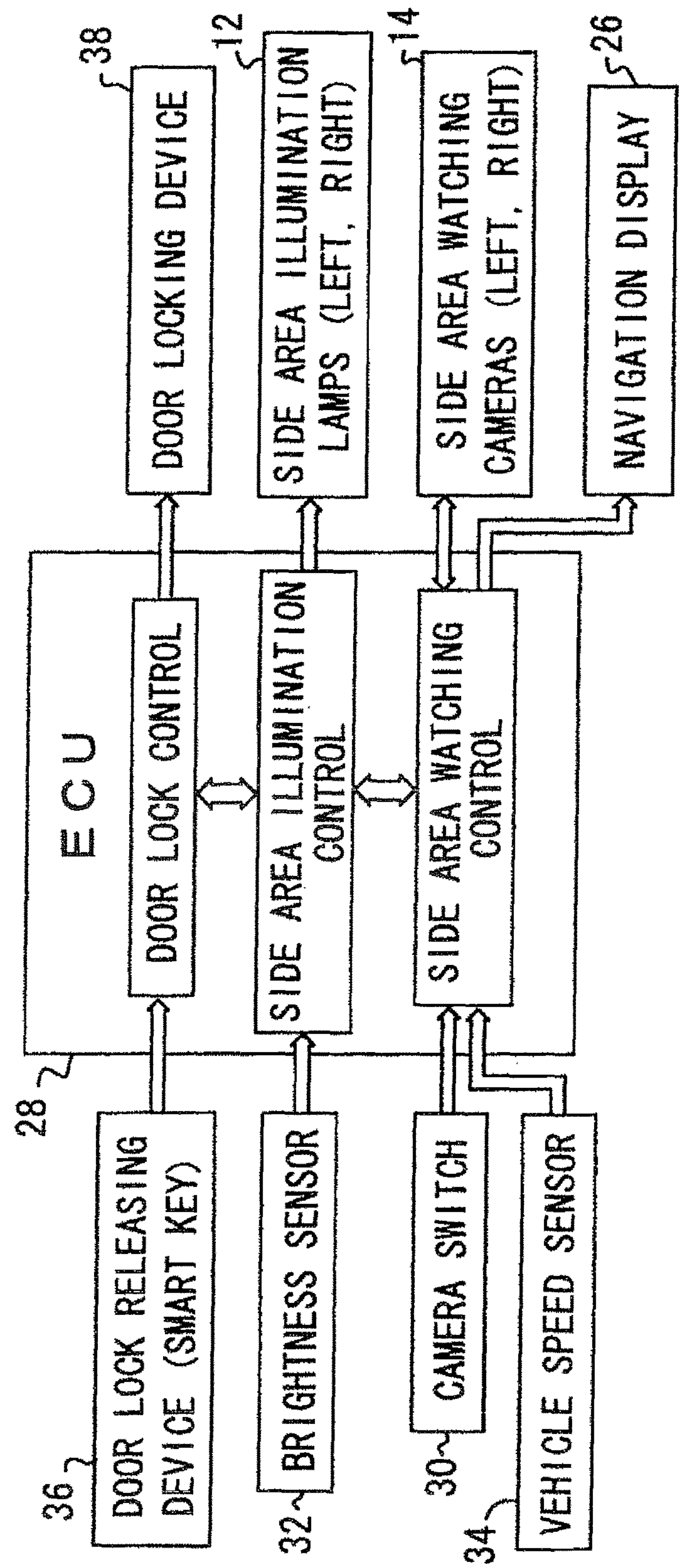
[FIG. 3]

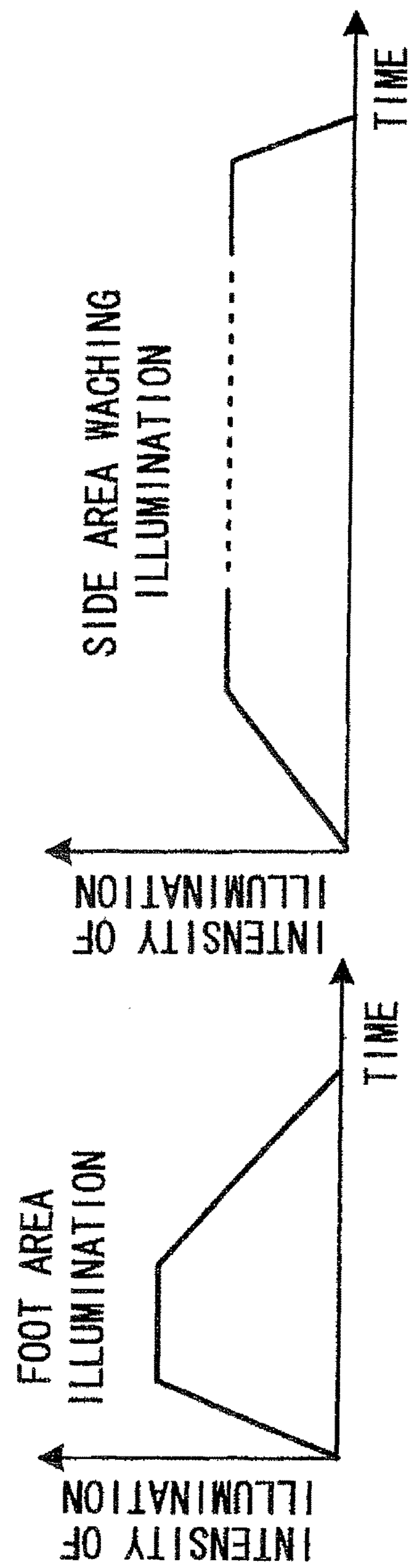
[FIG. 4]

[FIG. 5]
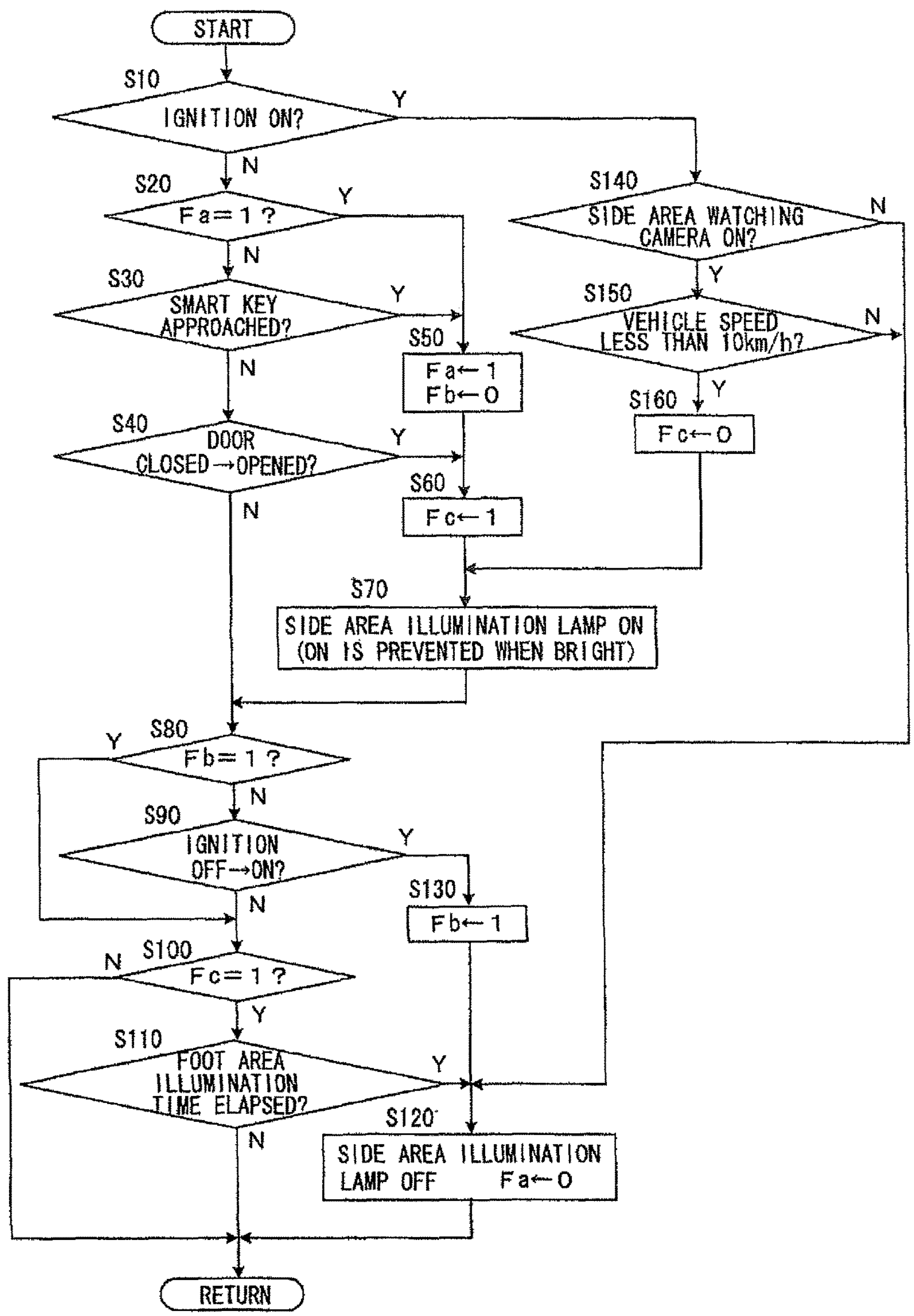

VEHICLE EQUIPPED WITH MEANS FOR ILLUMINATING/WATCHING A SIDE AREA THEREOF

CONTINUITY INFORMATION

This is a Continuation of U.S. application Ser. No. 13/521,107 filed Jul. 9, 2012, which is a National Phase of International Application No. PCT/JP2011/072189 filed Sep. 28, 2011. The disclosures of the prior applications are hereby incorporated by reference herein in their entireties.

FIELD OF THE INVENTION

The present invention relates to illuminating a foot area of the driver when he/she climbs into a vehicle such as an automobile in the darkness as well as enabling the driver to watch a side area of the vehicle under an illumination when he/she drives the vehicle carefully at low speed on a parking area, an alley or a mountain road in the darkness.

BACKGROUND ART

It is already so widely practiced in a lot of vehicles to illuminate a side road area of the vehicle by automatically putting on a lamp for illuminating such an area in reacting to a smart key carried by a driver when he/she approaches the vehicle to start driving the vehicle under parking as there should be no need of particularly referring to any known document. The lamps of this kind are mostly mounted in the door mirror so as to project light beams from the bottom face of the door mirror toward the side road area.

On the other hand, it is also partly practiced and described in the below-mentioned patent documents to mount watching cameras at various locations of the vehicle in various manners so as to provide the driver with views to supplement the views available through the front window, the side window and the rear window, such views thus obtained being shown on the navigation display. Particularly in Patent Documents 1 and 3, it is shown to mount such a camera at the door mirror, particularly at the one located on a side opposite to the driver's seat, so as to provide the driver with a view forward of the vehicle.

PRIOR ART DOCUMENTS

Patent Documents

Patent Document 1: JP Laid-open 2000-62531
Patent Document 2: JP Laid-open 2000-85408
Patent Document 3: JP Laid-open 2005-51403

SUMMARY OF THE INVENTION

Problem to be Solved by the Invention

In mounting a camera to supplement the view of the driver, when the camera is to obtain a view forward of the vehicle such as in the above-mentioned Patent Documents 1 and 2, since the area in front of the vehicle is illuminated by the head lamps of the vehicle, the camera can effectively work under the illumination by the head lamps. In the above-mentioned Patent Document 2, the camera is directed rearward or rear-sideward so as to effectively work when the vehicle is driven backward, and since an area in the rear of the vehicle is illuminated by the back-up lamps, the camera can also effectively work even in the darkness.

Now, the area illuminated by the widely used lamp which is automatically put on in reacting to the smart key to illuminate a road area at a side of the vehicle is a road area immediately aside to the vehicle in which the feet of the driver are located in climbing into the vehicle, and is the same as the road area whose information is very important for the driver who must carefully determine the sideward position of the vehicle in parking it or driving it on an alley or a mountain road. It is when the vehicle is driven at a very low speed including zero that the view of such a side road area is needed.

However, even though such a lamp illuminates the road area at the side of the vehicle which needs illumination when the vehicle is driven in parking or carefully driven on an alley or a mountain road, if the lamp is put on during a normal driving, it is impedimental for other vehicles and not desirable.

In view of the above-mentioned matters, it is an object of the present invention to provide a vehicle equipped with means for illuminating a foot area of the driver when he/she climbs into the vehicle while opening the door in the darkness, wherein the means also illuminates an immediately side road area of the vehicle to provide the driver with a view for watching such an area when he/she parks the vehicle or drives the vehicle carefully on an alley or a mountain road in the darkness, by supplementing substantially only a camera as a hardware in a vehicle equipped with a lamp adapted to be automatically put on to illuminate a side road area of the vehicle when the driver bearing a smart key approaches the vehicle, while the lamp does not cause such a problem that light beams are emitted sideward during a normal driving.

Means to Solve the Problem

In order to solve the above-mentioned problem, the present invention proposes a vehicle comprising a side area illumination lamp for illuminating a side road area of the vehicle, a side area watching camera for watching the side road area of the vehicle, a navigation display, and an electronic control unit for controlling operations of the side area illumination lamp, the side area watching camera and the navigation display, wherein the electronic control unit puts on the side area illumination lamp for a certain time duration when a man approaches the vehicle, and also puts on the side area illumination lamp when the vehicle is being driven at a speed less than a certain threshold speed with the side area watching camera being in operation.

The electronic control unit may change an illumination pattern of the side area illumination lamp according as whether the side area illumination lamp is put on for the certain time duration when a man approaches the vehicle (referred to as "foot area illumination" hereinunder) or the side area illumination lamp is put on when the vehicle is being driven at a speed less than the certain threshold speed with the side area watching camera being in operation (referred to as "side road area watching illumination" hereinunder). In this connection, the illumination patterns for the foot area illumination and the side road area watching illumination may both be to gradually increase an intensity of the illumination, then to maintain a final intensity of the illumination for respective certain time durations and to gradually decrease the intensity of the illumination to zero, wherein the final intensity of the illumination in the side road area watching illumination may be lower than that in the foot area illumination, the gradual increase of the intensity of the illumination in the side road area watching illumination may be slower than that in the foot area illumination, and/or the gradual decrease of the intensity of the illumination in the side road area watching illumination may be quicker than that in the foot area illumination.

The side area illumination lamp and the side area watching camera may be mounted in a door mirror.

The side area watching camera may be switched over between on and off conditions by a camera switch, and a view by the side area watching camera may be displayed on the navigation display only when the side area watching camera is in the on condition.

The vehicle may further comprise a brightness sensor for detecting a brightness of environment of the vehicle, wherein the electronic control unit may prevent to put on the side area illumination lamp when the brightness sensor is detecting the brightness above a certain level.

Two sets of the side area illumination lamp and the side area watching camera may be provided for the illumination and the watching of opposite sides of the vehicle.

The navigation display may divide a display screen into left and right side sections and may show the views by the left and right side cameras in the corresponding side sections.

It may only be when the man who approaches the vehicle carries a door lock releasing device that the electronic control unit puts on the side area illumination lamp for the certain time duration.

Effects of the Invention

When a vehicle comprises a side area illumination lamp for illuminating a side road area of the vehicle, a side area watching camera for watching the side road area of the vehicle, a navigation display, and an electronic control unit for controlling operations of the side area illumination lamp, the side area watching camera and the navigation display, wherein the electronic control unit puts on the side area illumination lamp for a certain time duration when a man approaches the vehicle, and also puts on the side area illumination lamp when the vehicle is being driven at a speed less than a certain threshold speed with the side area watching camera being in operation, a side road area of a parked vehicle is automatically illuminated when a man approaches the vehicle in the darkness to start driving the vehicle, and further, only by supplementing substantially a camera as a hardware, while utilizing such a foot area illumination lamp for starting to drive the vehicle in the darkness, the driver can be provided with a view for watching the position of the vehicle relative to an immediate side road area of the vehicle in parking the vehicle or carefully driving the vehicle on an alley or a mountain road in the darkness, without causing such a problem that light beams are projected sideward during a normal driving.

When the electronic control unit changes an illumination pattern of the side area illumination lamp according as whether the side area illumination lamp is put on for the foot area illumination or for the side road area watching illumination, the same side area illumination lamp can serve for the foot area illumination and the side road area watching illumination by changing an illumination pattern thereof even though the foot area illumination and the side road area watching illumination are much different from one another in the optimum manner of illumination. In this connection, in more detail, although the foot area illumination and the side road area watching illumination may both be in such an illumination pattern as to gradually increase an intensity of the illumination, then to maintain a final intensity of the illumination for respective certain time durations and to gradually decrease the intensity of the illumination to zero, the brightness and changes thereof of the foot area illumination should be adapted to be most desirable for the reaction of the human eyes to the light beams as the light beams of the foot area illumination are directly received by the human eyes, while the brightness and changes thereof of the side road area watching illumination should first be adapted to be most desirable for the reaction of an automatic exposure control device of the side area watching camera to the light beams as the light beams of the side road area watching illumination are received by the camera equipped with the automatic exposure control device.

Although the automatic exposure control device of camera adjusts the iris diaphragm to the brightness of the object to which the lens is directed, the adjustment is affected by the whole brightness of the environment. Since the amount of the light beams which the automatic exposure control device receives as a whole by the illumination of a part of the side road area and the door by the side area illumination lamp in the darkness is low as compared with the brightness of those objects viewed by the camera, the iris diaphragm of the automatic exposure control device is opened relatively widely such that, if the side area illumination lamp is put on in the same intensity of the illumination in side road area watching illumination as in the foot area illumination, the view through the camera is liable to become growing due to too much exposure. Therefore, in order to utilize the side area illumination lamp conventionally used for the foot area illumination also for the side road area watching illumination, one of the changes of the illumination pattern for adapting the side area illumination lamp to the side road area watching illumination is, when the illumination pattern is to gradually increase an intensity of the illumination, then to maintain a final intensity of the illumination for respective certain time durations and to gradually decrease the intensity of the illumination to zero, that the final intensity of the illumination in the side road area watching illumination is made lower than that in the foot area illumination. By such an arrangement, a clear view can be obtained by the side area watching camera even in the darkness.

When the conventional side area illumination lamp is utilized for the side road area watching illumination, it is another effective change of the illumination pattern that the gradual increase of the intensity of the illumination in the side road area watching illumination is made slower than that in the foot area illumination. The automatic exposure control device of camera requires a certain time to substantially change the adjustment of the iris diaphragm. Therefore, if the side area illumination lamp is put on to increase the intensity of the illumination in the manner as in the conventional foot area illumination when the side area watching camera is operating in the darkness, or if the side area illumination lamp is put on at the same time as the side area watching camera is put into operation from the condition where the iris diaphragm is widely open, the throttling of the iris diaphragm will not catch up with the increase of the brightness, and the view of the side area watching camera would once become growing. Such a growing of the view of the side area watching camera will be avoided by the gradual increase of the intensity of the illumination in the side road area watching illumination being made slower than that in the foot area illumination.

Still another effective change of the illumination pattern in utilizing the conventional side area illumination lamp for the side road area watching illumination, is that the gradual decrease of the intensity of the illumination in the side road area watching illumination is made quicker than that in the foot area illumination. It is considered to be comfortable for the driver and the passenger that the foot area illumination is put off slowly by taking a substantial time. On the other hand, there is no need of such a slow gradual putting off for the side road area watching illumination, and since in most cases the side road area watching illumination should be put off with the end of the driving of the vehicle, it is considered to be desirable that the side road area watching illumination is put off quickly as the ignition switch is turned off.

When the side area illumination lamp and the side area watching camera are mounted in a door mirror, the means for illuminating and watching the side road area of the vehicle can be desirably positioned by utilizing such a part of the vehicle as the door mirror that is already available as projecting from the side wall of the vehicle.

When the side area watching camera is switched over between on and off conditions by a camera switch, and a view by the side area watching camera is displayed on the navigation display only when the side area watching camera is in the on condition, the driver can obtain the view for watching the side road area of the vehicle on the navigation display instead of the normal navigation information only when he/she wishes to obtain the view for watching the side road area of the vehicle by the side area watching camera in parking the vehicle or driving the vehicle carefully on an alley or a mountain road.

When the vehicle further comprises a brightness sensor for detecting a brightness of environment of the vehicle, wherein the electronic control unit prevents to put on the side area illumination lamp when the brightness sensor is detecting the brightness above a certain level, the side area illumination lamp is not put on even when the side area watching camera is put into operation under a bright environment by the camera switch being operated by the driver in parking the vehicle or driving the vehicle carefully on an alley or a mountain road, so that it is prevented particularly that the side area illumination lamp is put on when the vehicle has slowed down or temporarily stopped due to a traffic snarl or the like in the daytime driving with the side area watching camera being in operation, thus preventing such a situation that the battery is uselessly consumed by the useless putting on of the side area illumination lamp.

When two sets of the side area illumination lamp and the side area watching camera are provided for the illumination and the watching of opposite sides of the vehicle, the foot area illumination is obtained on both of the sides of the driver's seat and the opposite passenger's seat when anyone climbs into each seat in the darkness, and the driver is provided with the views for watching the opposite sides road areas of the vehicle in parking the vehicle or driving the vehicle carefully on an alley or a mountain road regardless whether it is in the daytime or the darkness.

When the navigation display divides a display screen into left and right side sections and shows the views by the left and right side cameras in the corresponding side sections, the driver can manipulate the vehicle by comparing the positions of the vehicle relative to the left and right side road areas on the navigation display.

It is fundamentally to illuminate the foot area of the driver who approaches the vehicle to start driving the vehicle, and therefore, it is fundamentally due to a door lock control device reacting to a door lock releasing device such as the smart key that the electronic control unit puts on the side area illumination lamp for the certain time duration. However, such a side area illumination lamp may be put on when a man carrying no pertinent smart key approaches the vehicle, so that an effect of crime prevention is available.

BRIEF DESCRIPTION OF THE DRAWINGS

FIG. 1 A perspective view showing an example of a vehicle in which a combination of the side area illumination lamp and the side area watching camera according to the present invention is mounted in the door mirror.

FIG. 2 A view showing an example of displaying the views by the left and right side area watching cameras by the navigation display with a screen thereof being divided into left and right halves when the combination of the side area illumination lamp and the side area watching camera like those shown in FIG. 1 are mounted in the left and right door mirrors, respectively.

FIG. 3 A block diagram showing the construction of the vehicle concerned with the present invention in the form of an embodiment.

FIG. 4 A set of graphs showing an example of changing the intensity of the illumination and the manner of increasing/decreasing thereof according as whether it is the foot area illumination or the side road area watching illumination.

FIG. 5 A flowchart showing the manner of operation of the vehicle concerned with the present invention in the form of an embodiment.

DESCRIPTION OF THE EMBODIMENT

In the vehicle shown in FIG. 1 in a perspective view, the side area illumination lamp and the side area watching camera are mounted in each of left and right door mirrors 10L and 10R. As shown only with respect to the left door mirror 10L, the side area illumination lamp 12 and the side area watching camera 14 are adapted to project illumination light beams from the underside of the door mirror so as to illuminate a side road area of the vehicle and to watch a view looked downward from the underside of the door mirror, respectively.

FIG. 2 shows only the screen portion of the navigation display incorporated in the front panel of the vehicle shown in FIG. 1. In the shown condition, the horizontally elongated screen 18 is divided into left and right halves instead of the normal navigation screen, so as to show the watching views by the left and right side area watching cameras, respectively. The views shown in the figure are those obtained by the left and right side area watching cameras when the vehicle is on a road surface 24 bearing white lines 20 and 22 as slightly inclined relative thereto. In the shown condition, the left and right side area watching cameras are adjusted to provide such views that include small portions of the outer surfaces of the left and right doors, respectively.

The construction of the vehicle concerned with the present invention including the above-mentioned side area illumination lamp 12 and the side area watching camera 14 may be such as shown by a block diagram in FIG. 3 as an embodiment thereof. As sown in FIG. 3, the construction of the vehicle concerned with the present invention includes, in addition to the above-mentioned side area illumination lamps 12 and the side area watching cameras 14, a navigation display 26 having the above-mentioned screen 18, and an electronic control unit (ECU) 28 for controlling the operations of those side area illumination lamps, side area watching cameras and navigation display The electronic control unit 28 is supplied with a signal from a camera switch 30 for switching over the side area watching cameras

14 between on and off conditions, and a signal from a brightness sensor 32 for detecting the brightness of environment of the vehicle, though not indispensable for the construction of the present invention. Further, a vehicle speed sensor 34 is included in the shown construction. However, since the information required for the present invention with regard to the vehicle speed is whether the vehicle speed is less than a certain relatively low speed or not, such information may be obtained from a conventional speed sensor normally equipped in the vehicle. Further, since the side area illumination lamps 12 are adapted to be put on by a door lock control device sensing an approach of a smart key in the shown embodiment, a door lock releasing device (smart key) 36 and a door locking device 38 are also included in the construction. In this connection, the control for putting on the side area illumination lamps 12 for a certain time duration when a man approaches the vehicle may be operated according to any other information which indicates an action that a man approaches the vehicle to start driving by releasing the door lock, or, as already mentioned, according to an action that a man approaches the vehicle even with no door lock releasing device such as a smart key from the view point of crime prevention.

The electronic control unit (ECU) 28 may be such one that is provided to execute various electronic controls of the vehicle by a micro-computer, wherein the present invention may use at least a part of such an overall electronic control unit for the door lock control, the side area illumination control and the side area watching control as a matter of software. Therefore, such a door lock control portion, such a side area illumination control portion and such a side area watching control portion are connected with one another in the electronic control unit 28 so as to give and take the necessary information therebetween.

In the shown embodiment, the door lock control portion of the electronic control unit (ECU) 28 operates based upon a signal from the door lock releasing device 36 like the smart key so as to release the door locking device 38 when the driver places his/her hand on the door grip, and apart from such an operation, the door lock control portion also sends a signal to the side area illumination control portion when it is sensed that the door lock releasing device 38 has approached the vehicle, so that the side area illumination control portion puts on the side area illumination lamp 12*s* for a certain time duration. On this occasion, the side area illumination control portion is supplied with a signal with regard to the brightness of environment of the vehicle from the brightness sensor 32, and when it is sensed by the brightness sensor 32 that the brightness of environment of the vehicle is above a certain level, the side area illumination control portion does not put on the side area illumination lamps 12 regardless of the signal from the door lock control portion.

On the other hand, the camera switch 30 is to change over the side area watching camera 14 between on and off states according to a manipulation of the driver, wherein the side area watching control portion of the electronic control unit (ECU) 28 is supplied with a signal from the camera switch 30 for putting on or off the side area watching cameras 14 and a signal from the vehicle speed sensor 34 with regard to whether the vehicle speed is less than a certain relatively low value. Based upon these signals, the side area watching control portion puts on or off the side area watching camera 14, and when it puts on the side area watching camera 14, it dispatches a signal for demanding to putt on the side area illumination lamps 12 to the side area illumination control portion if the vehicle speed is less than the above-mentioned certain value. The side area illumination control portion puts on the side area illumination lamps 12 based upon the signal for demanding to put on the side area illumination lamps 12, provided that the brightness sensor 32 is not detecting that the brightness of environment of the vehicle is above a certain level, but does not put on the side area illumination lamps 12 regardless of the signal from the side area watching control portion if the brightness sensor 32 is detecting that the brightness of environment of the vehicle is above the certain level.

The side area illumination control portion puts on the side area illumination lamps 12 according to the signal from the door lock control portion or the side area watching control portion in different illumination patterns relative to the lapse of time such as shown in FIG. 4. The contrast between the illumination pattern of the foot area illumination and that of the side area watching illumination in changing the intensity of the illumination according to the lapse of time is shown in the figure as all three manners of change are incorporated in gradually increasing the intensity of the illumination after the start, then maintaining the intensity of the illumination at a constant level for a certain time duration, and then gradually decreasing the intensity of the illumination to zero, such that the constant level of the illumination of the side area watching illumination is made lower than that of the foot area illumination, the speed of gradually increasing the intensity of the illumination of the side area watching illumination is made slower than that of the foot area illumination, and the speed of gradually decreasing the intensity of the illumination of the side area watching illumination is made quicker than that of the foot area illumination.

FIG. 5 is a flowchart showing the manner of controlling the putting on of the side area illumination lamps 12 by the above-mentioned construction in the form of an embodiment. The control according to such a flowchart may be repeated in the electronic control unit (ECU) 28 at a cycle time such as tens of millisecond throughout the period when the power source of the vehicle is made on.

In step (S) 10, it is judged if the ignition switch is on or not. When the vehicle is parked, the answer is no (N), and then the control proceeds to step 20. In step 20, it is judged if a flag Fa is 1 or not. The flag Fa is set to 1 when it is detected in the next step 30 that the smart key has approached the vehicle from the outside thereof, and is reset to 0 when the side area illumination lamp is put off in step 120 described later. When the vehicle is being parked after it has once been driven, the flag Fa is being reset to 0. Therefore, when the vehicle is being parked, the answer of step 20 is no until the following steps 30 and 50 are executed, and therefore, until then the control proceeds to step 30. In step 30, it is judged if the smart key has approached the vehicle or not. As long as the answer is no, the control proceeds to step 40. In step 40, it is judged if the door was opened from the closed state or not.

On the other hand, when the smart key has approached the vehicle, the answer of step 30 becomes yes (Y), and therefore the control proceeds to step 50, and the flag Fa is set to 1, while a flag Fb described later is reset to 0. When the answer of step 30 becomes yes by the smart key having approached the vehicle, or when the answer of step 40 becomes yes with no smart key approaching the vehicle but the door being opened from the closed state, the control proceeds to step 60, and a flag Fc described later is set to 1.

The above steps 20-60 are to detect that the smart key has approached the vehicle parked with the ignition switch being off, or the door was opened with the ignition switch being off after the vehicle has been stopped or parked. When either of the two is detected, the control proceeds to step 70 after having set the flag Fc to 1, and the side area illumination lamp is put on, provided that the brightness of environment of the vehicle detected by the brightness sensor 32 is not above a certain level, while if it is above the certain level, the side area illumination lamp is not put on.

Then the control proceeds to step 80, and it is judged if the flag Fb is 1 or not. Since the flag Fb is reset to 0 in step 50 as described above, while it is set to 1 in step 130 described later, the answer at this time is no, and the control proceeds to step 90, where it is judged if the ignition switch was turned over from off to on. Since it takes a time for the driver to open the door and sit on the driver's seat, the answer does not become yes for a while, and therefore in the meantime the control proceeds to step 100, where it is judged if the flag Fc is 1 or not. When the control came here through step 50 by the smart key having approached the vehicle, the flag Fc is being set to 1 through step 60, and therefore the answer is yes. Then the control proceeds to step 110. In step 110, it is judged if the certain time duration for temporarily putting on the side area illumination lamp for illuminating a foot area of the driver has elapsed or not. The answer is no for a while, and in the meantime the control returns from here to step 10, so that the control circulates through steps 70, 80, 90, 100 and 110. When the certain time duration has elapsed so that the answer of step 110 becomes yes, the control proceeds to 120, and the side area illumination lamp is put off. Here the flag Fa is reset to 0.

When the driver bearing the smart key climbs into the vehicle, and the ignition switch is turned from off to on so that the driving of the vehicle is started, the control proceeds from step 90 to step 130, where the flag Fb is set to 1.

After the driving of the vehicle has started with the ignition switch being made on, the answer of step 10 is yes, and thereafter the control proceeds to step 140. In step 140, it is judged if the side area watching camera is on (operating) or not. When the answer is no, the control proceeds directly to step 120, while the side area illumination lamp is kept in the off state. When the answer of step 140 is yes, the control proceeds to step 150, and it is judged if the vehicle speed is less than a certain low threshold speed such as, for example, 10 km/h. When the answer is no, the control proceeds still to step 120, so that the side area illumination lamp is kept in the off state.

On the other hand, when the answer of step 140 is yes and the answer of step 150 is also yes, the control proceeds to step 160, where the flag Fc is reset to 0, and the control starts to proceed to step 70. Then the control proceeds to step 80, where at this time the flag Fb is being set to 1, and therefore the control bypasses step 90, and further, since the flag Fc is being reset to 0, the answer of step 100 is no, and therefore the control bypasses step 110 to re-circulate. Therefore, while the vehicle is being driven, when the side area watching camera is made on, the side area illumination lamp is continuously made on when the vehicle speed has lowered to be less than e.g. 10 km/h, so that, if the brightness of environment of the vehicle is not higher than a certain level, the side area illumination lamp is continuously put on. When the side area watching camera is made off, or even when the side area watching camera is made on, if the vehicle speed exceeds the above-mentioned threshold speed, the control proceeds to step 120, and the side area illumination lamp is put off.

Although the present invention has been described in detail with respect to an embodiments thereof, it will be apparent for those skilled in the art that various modifications are possible with respect to the shown embodiment within the scope of the present invention.

EXPLANATION OF REFERENCE NUMERALS

10L, 10R . . . door mirror, 12 . . . side area illumination lamp, 14 . . . side area watching camera, 16 . . . side road area, 18 . . . screen of navigation display, 20, 22 . . . while lines, 24 . . . road surface, 26 . . . navigation display, 28 . . . electronic control unit (ECU), 30 . . . camera switch, 32 . . . brightness sensor, 34 . . . vehicle speed sensor, 36 . . . door lock releasing device (smart key), 38 . . . door locking device

The invention claimed is:

1. A vehicle comprising
- a side area illumination lamp for illuminating a side road area of the vehicle,
- a side area watching camera for watching the side road area of the vehicle,
- a navigation display, and
- an electronic control unit for controlling operations of the side area illumination lamp, the side area watching camera and the navigation display, wherein the electronic control unit:
  - puts on the side area illumination lamp for a certain time duration at a first final intensity when a person approaches the vehicle for foot area viewing illumination, and
  - also puts on the side area illumination lamp at a second final intensity lower than the first final intensity when the vehicle is being driven at a speed less than a certain threshold speed with the side area watching camera being in operation for camera shooting illumination.

2. A vehicle according to claim 1, wherein the electronic control unit changes an illumination pattern of the side area illumination lamp based on whether:
- the side area illumination lamp is put on for the foot area viewing illumination for the certain time duration when the person approaches the vehicle or
- the side area illumination lamp is put on for the camera shooting illumination when the vehicle is being driven at the speed less than the certain threshold speed with the side area watching camera being in operation.

3. A vehicle according to claim 2, wherein the illumination patterns for the foot area viewing illumination and the camera shooting illumination are both to gradually increase an intensity of the illumination, then to maintain the respective final intensities of the illumination for respective certain time durations and to gradually decrease the intensity of the illumination to zero.

4. A vehicle according to claim 2, wherein
- the illumination patterns for the foot area viewing illumination and the camera shooting illumination are both to gradually increase an intensity of the illumination, then to maintain the respective final intensities of the illumination for respective certain time durations and to gradually decrease the intensity of the illumination to zero, and
- the gradual increase of the intensity of the illumination in the camera shooting illumination is slower than that in the foot area viewing illumination.

5. A vehicle according to claim 2, wherein
- the illumination patterns for the foot area viewing illumination and the camera shooting illumination are both to gradually increase an intensity of the illumination, then to maintain the respective final intensities of the illumination for respective certain time durations and to gradually decrease the intensity of the illumination to zero, and the gradual decrease of the intensity of the illumination in the camera shooting illumination being quicker than that in the foot area viewing illumination.

6. A vehicle according to claim 1, wherein the side area illumination lamp and the side area watching camera are mounted in a door mirror.

7. A vehicle according to claim 1, wherein the side area watching camera is switched over between on and off conditions by a camera switch, and a view by the side area watching camera is displayed on the navigation display only when the side area watching camera is in the on condition.

8. A vehicle according to claim 1, further comprising a brightness sensor for detecting a brightness of environment of the vehicle, wherein the electronic control unit prevents the side area illumination lamp from being put on when the brightness sensor is detecting the brightness above a certain level.

9. A vehicle according to claim 1, wherein two sets of the side area illumination lamp and the side area watching camera are provided for the illumination and the watching of opposite sides of the vehicle.

10. A vehicle according to claim 9, wherein the navigation display divides a display screen into left and right side sections and shows views by the side area watching cameras.

11. A vehicle according to claim 1, wherein the electronic control unit puts on the side area illumination lamp for the certain time duration only when the person approaches the vehicle with a door lock releasing device.

* * * * *